O. SHERWOOD, Jr.
Grinding Mill.
No. 36,804.　　　　　　　　　　Patented Oct. 28, 1862.
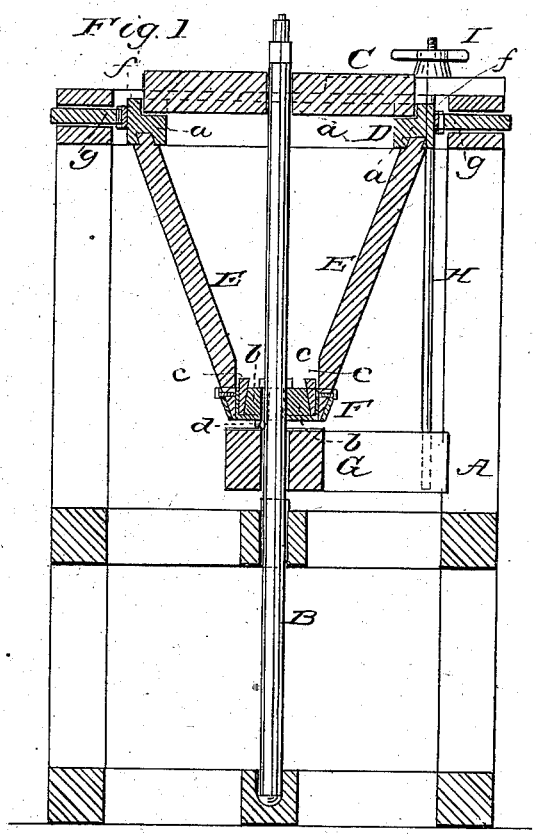
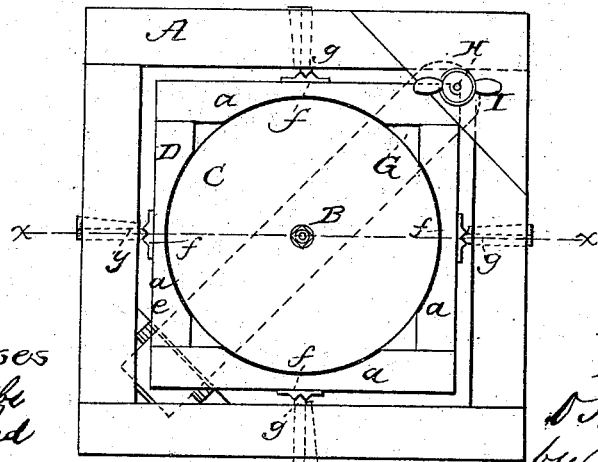

UNITED STATES PATENT OFFICE.

O. SHERWOOD, JR., OF INDEPENDENCE, IOWA.

IMPROVEMENT IN GRINDING-MILLS.

Specification forming part of Letters Patent No. 36,804, dated October 28, 1862.

*To all whom it may concern:*

Be it known that I, O. SHERWOOD, Jr., of Independence, in the county of Buchanan and State of Iowa, have invented a new and useful Improvement in Grinding-Mills; and I do hereby declare that following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention relates to an improvement in regulating millstones for the purpose of causing them to grind finer or coarser, as may be desired; and it consists in having the bed-stone arranged in such a manner that it may be raised and lowered on the spindle, while the latter, as well as the upper stone or runner, and the water-wheel have a rotary motion only.

The object of the invention is to obviate the difficulty attending the raising and lowering of the runner, spindle, and water-wheel, in order to regulate the degree of fineness in which the grain is to be ground. The water-wheel in being raised and lowered is liable to get filled or choked up with trash, and particularly with ice during the winter season, which obstructs this movement, and it is extremely difficult to preserve the parallelism of the two stones when the runner is made to rise and fall.

To enable those skilled in the art to fully understand and construct my invention, I will proceed to describe it.

A represents a framing of rectangular form, and B is a spindle which is connected with or forms a part of the shaft of a horizontal water-wheel. The upper millstone or runner is placed on the top of the spindle B, as usual, and the water-wheel, which is not represented, may be constructed in any proper way. The spindle or shaft B is allowed to rotate freely in its bearings, but is not allowed to rise and fall. The top stone or runner, therefore, is not adjustable vertically in order to regulate the degree of fineness of the grain being ground.

C represents the bed-stone, which does not rotate, and is fitted in a square frame, D.

This frame D is placed in the upper part of the framing A, and it is supported by four oblique bars, E, the upper ends of which are framed, one in each side bar, $a$, of the frame D, and the lower ends fitted in a bush, F, which is placed loosely on the spindle or shaft B, and provided with boxes $b$, which are adjusted to the spindle or shaft B by keys $c$. The bush F rests upon a bridge-tree, G, the former having small projections $d$, which rest or bear on the latter. The bridge-tree rests at one end on a bearing, $e$, and the opposite end is raised and lowered by a screw-rod, H, and nut I, arranged in the ordinary way.

From the above description it will be seen that the bed-stone C may be raised and lowered, as desired, in order to regulate the degree of fineness in which the grain is to be ground, and the stone C is allowed to adjust itself to the face of the upper stone or runner so as always to preserve the parallelism of the two stones, for the boxes $b$ of the bush F are allowed sufficient play to admit of the bush working more or less out of a horizontal position to admit of the bed-stone C depressing or inclining itself under the action of the runner to effect this result.

I would remark that the frame D, in which the bed-stone C is fitted or placed, is provided at each side with a plate, $f$, having a vertical groove in it, and these grooves receive pins $g$, which pass horizontally through the upper part of the framing A. These grooved plates and pins serve as guides for the frame D. Thus by this simple arrangement the difficulties attending the raising and lowering of the water-wheel and the upper stone or runner, in order to regulate the degree of fineness of the grinding, are fully obviated.

Having thus described my invention, what I claim as new, and desire to secure by Letters Patent, is—

The adjustable frame D, having the bed-stone C placed upon it, and arranged as shown in connection with the spindle or shaft B and the upper stone or runner, so as to be operated through the medium of the bridge-tree G, for the purpose herein set forth.

O. SHERWOOD, JR.

Witnesses:
GILES W. THOMAS,
A. J. FRENCH.